(12) United States Patent
Wayne

(10) Patent No.: US 6,454,491 B1
(45) Date of Patent: Sep. 24, 2002

(54) PORTABLE SEAWALL SYSTEM

(76) Inventor: Mark Wayne, 29436 Briarbank Ct., Southfield, MI (US) 48034

( * ) Notice: Subject to any disclaimer, the term of this patent is extended or adjusted under 35 U.S.C. 154(b) by 0 days.

(21) Appl. No.: 09/449,331

(22) Filed: Nov. 24, 1999

Related U.S. Application Data

(60) Provisional application No. 60/109,672, filed on Nov. 24, 1998.

(51) Int. Cl.[7] .............................. E02B 3/04; E02B 3/00
(52) U.S. Cl. ........................... 405/32; 405/31; 405/285
(58) Field of Search ........................... 405/31, 32, 284, 405/285, 287

(56) References Cited

U.S. PATENT DOCUMENTS

| | | | | |
|---|---|---|---|---|
| 414,913 A | * | 11/1889 | Lommer | 405/285 |
| 952,645 A | * | 3/1910 | Smith | 405/285 |
| 3,815,369 A | * | 6/1974 | Meredith | 405/285 |
| 3,869,868 A | * | 3/1975 | Irsai | 61/49 |
| 4,362,432 A | * | 12/1982 | Conover | 405/33 |
| 4,674,921 A | | 6/1987 | Berger | 405/262 |
| 4,804,299 A | * | 2/1989 | Forte et al. | 405/285 |
| 4,842,442 A | * | 6/1989 | Caulfield | 405/31 |
| 4,917,543 A | | 4/1990 | Cole et al. | 405/262 |
| 5,118,217 A | | 6/1992 | Younes | 405/114 |
| 5,125,765 A | * | 6/1992 | Verble | 405/31 |
| 5,127,770 A | | 7/1992 | Ditcher et al. | 405/262 |
| 5,145,287 A | | 9/1992 | Hooper et al. | 405/242 |
| 5,224,794 A | * | 7/1993 | Atkinson et al. | 405/32 |
| 5,259,712 A | | 11/1993 | Wayne | 410/152 |
| D350,526 S | | 9/1994 | Wayne | D12/406 |
| 5,382,087 A | * | 1/1995 | Pouch | 312/140.2 |
| 5,439,316 A | | 8/1995 | Richardson | 405/114 |
| 5,588,786 A | * | 12/1996 | House et al. | 405/285 |
| 5,628,442 A | | 5/1997 | Wayne | 224/543 |
| 5,655,851 A | | 8/1997 | Chor | 405/31 |
| 6,024,516 A | * | 2/2000 | Taylor et al. | 405/262 |
| 6,079,904 A | * | 6/2000 | Trisl | 405/107 |
| 6,179,521 B1 | * | 1/2001 | Muramatsu et al. | 405/115 |

* cited by examiner

Primary Examiner—Thomas B. Will
Assistant Examiner—Raymond W Addie
(74) Attorney, Agent, or Firm—Gifford, Krass, Groh, Sprinkle, Anderson & Citkowski, P.C.

(57) ABSTRACT

A portable seawall system is designed to upwardly extend an existing seawall. The system includes a base bracket designed to attach to the upper edge of the existing seawall. A wall section extends upwardly from the existing seawall. Multiple triangular brace assemblies each extend above and below the base bracket and engage the wall section and the existing seawall. A membrane seals the wall section to the existing seawall. The membrane is interconnected with the wall section and with the existing seawall. Multiple wall sections may be joined end to end to form a continuous seawall.

38 Claims, 8 Drawing Sheets

PORTABLE SEAWALL SYSTEM

CROSS-REFERENCE TO RELATED APPLICATIONS

This application claims the benefit of United States Provisional Application having Serial No. 60/109,672 filed Nov. 24, 1998.

FIELD OF THE INVENTION

This invention relates to a seawall system and more particularly to a portable extension to a seawall or a temporary seawall for use with any foundation, including the soil, which is in need of protection from the entry of water.

BACKGROUND OF THE INVENTION

Seawalls have been used for many centuries to prevent the entry of water into areas in need of protection. These seawalls have been constructed of many materials, originally of dirt and stone and later made of cement and other more permanent materials. The seawall's primary function has been to prevent water from entering a particular area whether it be caused by rising tides or by other conditions. The typical seawall is designed to handle a certain range of water heights and to prevent the entry of water under normal circumstances. This range is kept narrow for aesthetic purposes. Typically, the population does not want a seawall which is so high that it prevents the viewing of the restrained body of water under normal circumstances. Due to this requirement seawalls typically are not sufficiently high to prevent the entry of water under extremely high tides, high wind conditions or hurricane conditions.

The entry of water under extraordinary conditions can cause great damage to the affected property. In response to these requirements, numerous systems have been devised. One such system is U.S. Pat. No. 4,842,442 which discloses an apparatus for extending the protection of a capped seawall. This system requires a particular, pre-existing structure on the seawall and an extensive foundation in order to support the extension. Additionally, it is difficult to assemble and the foundation requirements for the support system are very inflexible. Other seawall systems have been devised, such as sandbag systems and pre-cast concrete systems. These systems are difficult to place in the desired locations and do not lend themselves to compact and efficient storage.

SUMMARY OF THE INVENTION

The present invention provides an approved portable seawall system designed to either upwardly extend an existing seawall or to attach to the ground. The system includes a base bracket configured to attach to the upper edge of an existing seawall. A wall section is provided to extend upwardly from the existing seawall. A plurality of triangular brace assemblies each have a portion extending above the base bracket and engaging the wall section and another portion extending below the base bracket and engaging an existing seawall. A membrane seals the wall section to the existing seawall. Means for interconnecting the membrane with the wall section and with the existing seawall are provided as well as means for joining a plurality of wall sections at the end.

DETAILED DESCRIPTION OF THE INVENTION

The present invention provides a portable seawall system for use in preventing the entry of water into an area. The system is designed primarily to act in conjunction with a prior existing seawall but can be adapted to operate as a stand-alone system with a modified base which can be attached to a foundation or directly to the soil. The system is designed to be modular in nature in the respect that by combining parts the wall can be extended to an indefinite length and to a variable height. The wall can also be made to change directions or even to surround the perimeter of a property.

Figure 1:
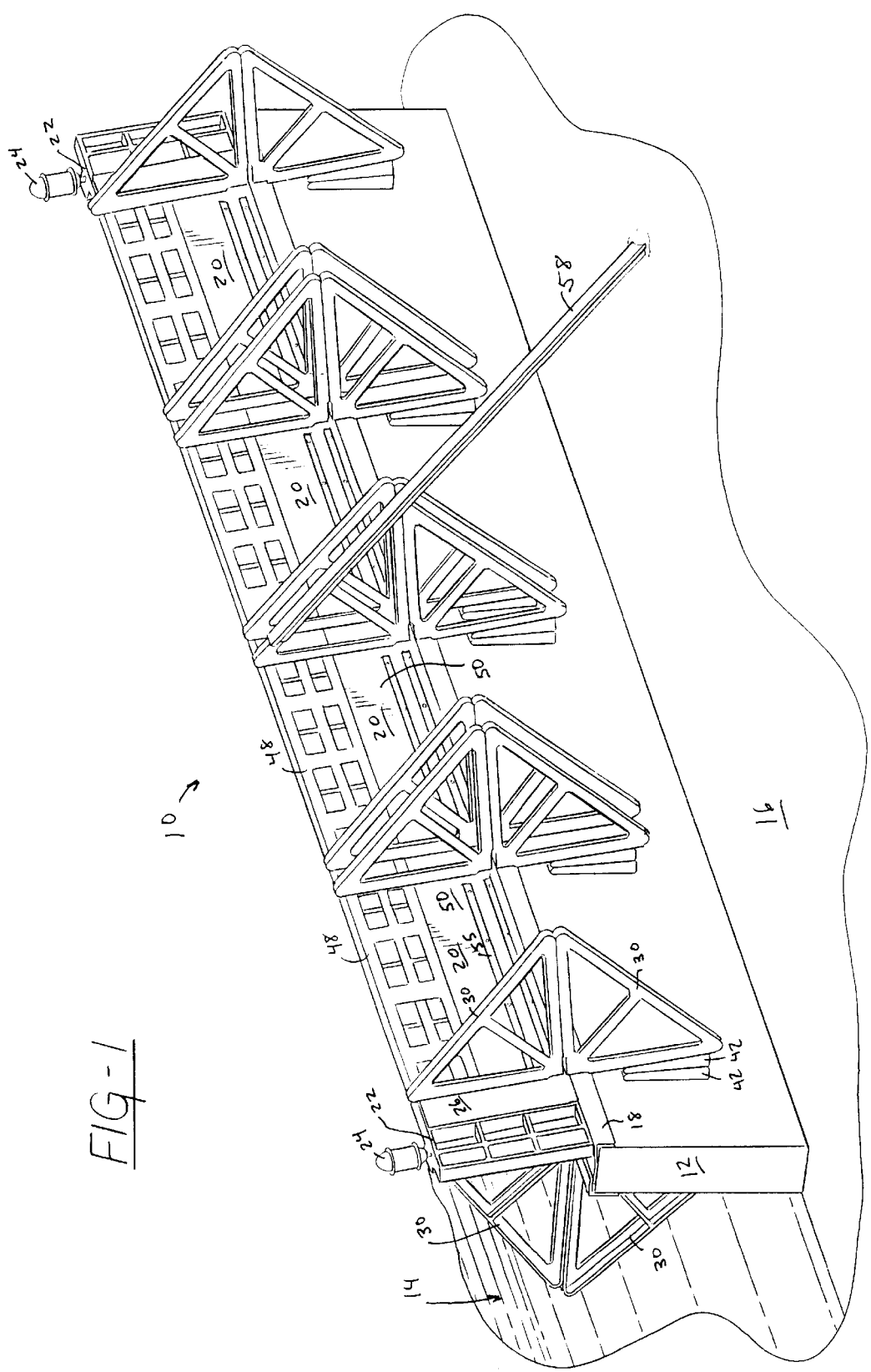
FIG. 1 is a perspective view of a portable seawall system according to the present invention installed on top of an existing permanent seawall.
Figure 2:
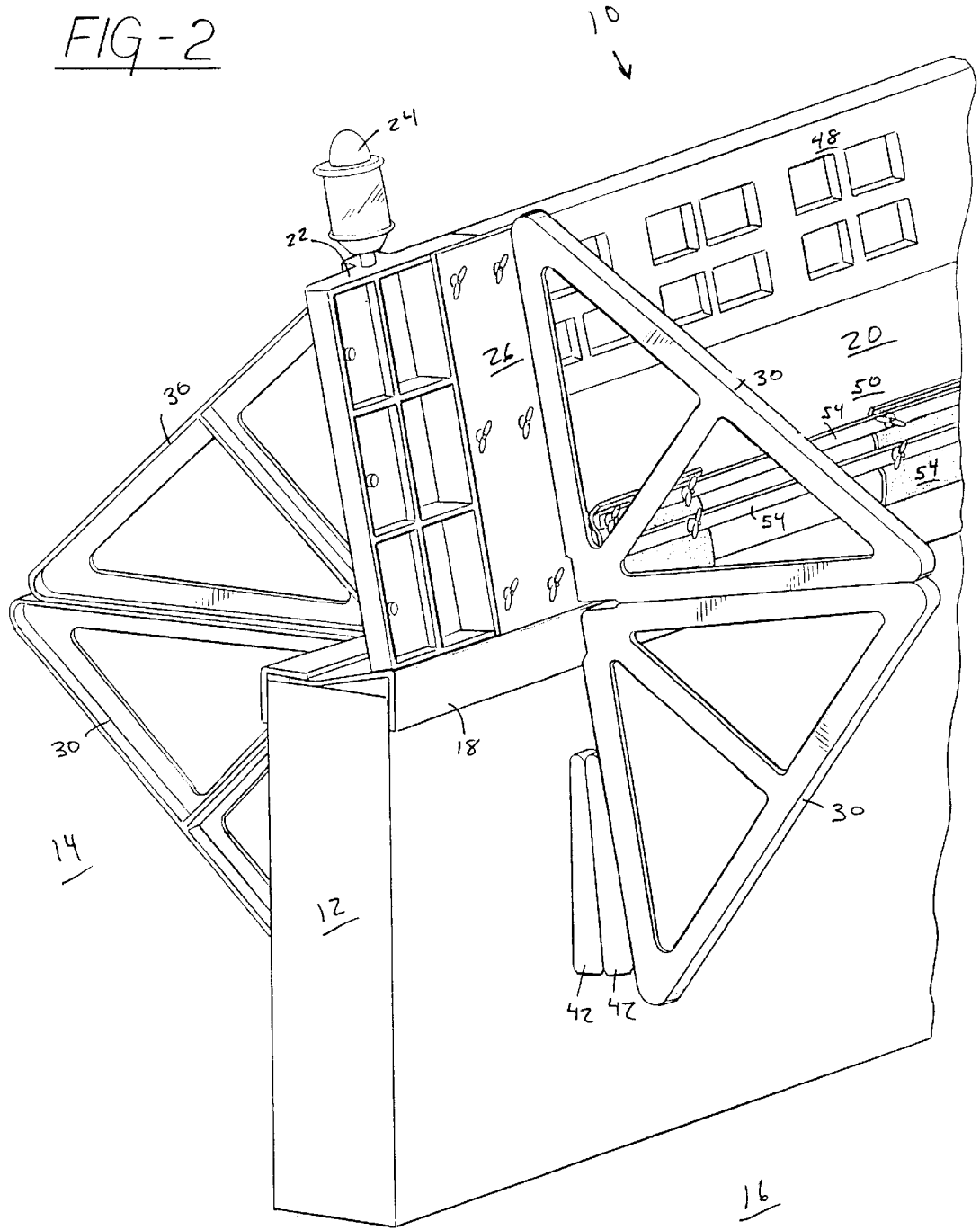
FIG. 2 is a perspective view of a portion of the portable seawall system of FIG. 1, showing several details thereof.

Referring to FIGS. 1 and 2, a portable seawall system according to the present invention is shown generally at 10. In this embodiment, the system 10 is shown mounted on top of an existing seawall 12 so as to allow the seawall 12 and system 10 to cooperate to hold back water higher than the existing seawall 12 would normally be capable of. For clarity of description, one side of the seawall 12 is designated as the water side 14 and the other side is designated as the dry side 16. The seawall system 10 is designed to prevent water from moving from the water side 14 to the dry side 16. Obviously, FIGS. 1 and 2 show only a portion of a seawall. In practice, the existing seawall 12 and portable seawall system 10 would be extended over long distances or be positioned so as to surround an area which is meant to stay dry.

The portable seawall system 10 includes a base bracket 18 which is affixed to the top of the existing seawall 12. Extending upwardly from the base bracket 18 are a plurality of wall sections 20 arranged end to end so as to be coplanar.

At periodic intervals, columns 22 are positioned between adjacent wall sections 20. In some embodiments, these columns 22 include lights 24 positioned atop them Each column 22 is interconnected with its adjacent wall section 20 by connection plates 26 which act both as expansion joints and as seals so as to prevent leakage between the column 22 and its adjacent wall section 20. The wall sections 20 are also preferably interconnected by connection plates 26, though they are not shown in FIGS. 1 and 2.

Figure 3:
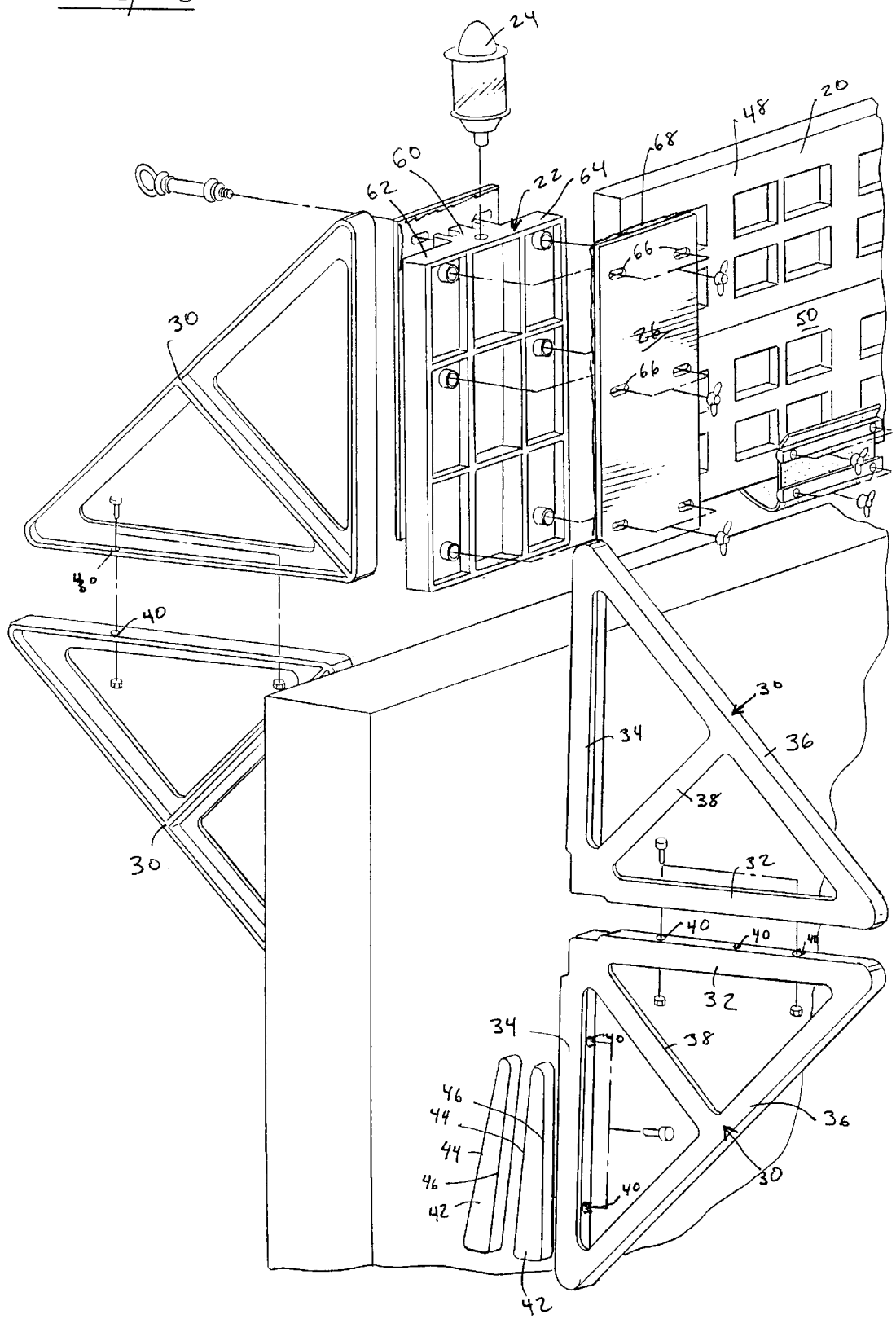
FIG. 3 is an exploded view of the system of FIG. 1, showing some of the constituent part thereof.

The wall sections 20, columns 22, and connection plates 26 are reinforced in their upwardly extending positions by a plurality of triangular brackets 30. The details of the triangular bracket 30 are best shown in FIGS. 2 and 3. In the preferred embodiment, the triangular bracket 30 has a perimeter shaped as a right angle triangle with a pair of short sides 32 and 34 and along side 36. To reinforce the bracket 30, a brace 38 extends perpendicularly from the midpoint of the long side 36 to the point where the short sides 32 and 34 join. Each of the sides 32–36 are preferably formed like an angle iron with one leg of the angle residing in the plane of the bracket 30 and one leg of the angle extending perpendicularly therefrom. The portions of the sides 32–36 extending perpendicularly to the plane have a variety of slots or holes 40 defined therein that act as connection points for interconnecting the brackets with each other and with the other portions of the seawall system 10. The triangular brackets 30 are preferably molded from plastics or composites and are designed so as to allow efficient molding. The brackets 30 are also designed to be used in a variety of ways. That is, more than one bracket may be used in combination as shown in FIGS. 1 and 2. In FIG. 2, four triangular brackets 30 are shown supporting the wall section 20. On each side of the wall section 20 of an existing seawall 12, a pair of triangular brackets 30 are connected so that two of their short sides are joined thereby creating a double size right angle triangular bracket.

For some applications, it is desirable to place the wall sections 20 at an angle such that they are tilted towards the water side 14 of the existing seawall 12. This helps to prevent waves from splashing over the top of the wall section 20. In the embodiment shown in FIGS. 1 and 2, the base bracket 18, which is joined to the top of the existing seawall 12, has a tilted upper surface. The wall section 20 extends perpendicularly upwardly from the angled upper surface of the base bracket 18 thereby causing the wall section 20 to tilt towards the water side 14. In the illustrated embodiment, the wall section 20 is tilted approximately 10 degrees towards the water side 14. Because the triangular brackets 30 are shaped as right angle triangles, wedge brackets 42 are provided for interconnecting the triangular brackets 30 with the wall section 20 and/or the existing seawall 12 at their relative angles.

Referring now to FIG. 3, details of the wedge bracket 42 are shown. Each of the wedge-shaped brackets 42 has a pair of long sides 44 and 46 which are angled apart by five degrees. The wedge brackets 42 are preferably molded from composite or plastic but may alternatively be made from other materials. Though not shown, the wedge brackets 42 may include connection points for interconnection with the other components of the seawall system 10.

Figure 6:
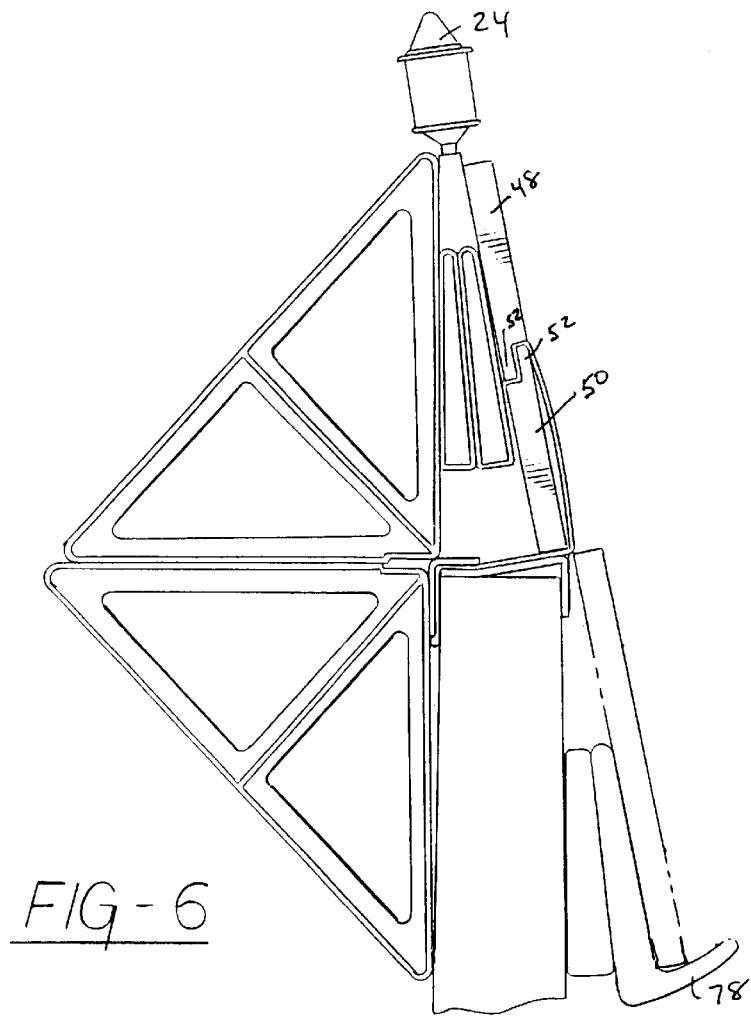
FIG. 6 is an end view of a seawall system according to the present invention illustrating its foldability for storage during periods of non-use.

Referring to FIGS. 1–3, two wedge brackets 42 are stacked between the existing seawall 12 and the short side of one of the triangular brackets 30 so that the double sized triangular bracket assembly formed by the two triangular brackets 30 is tilted at an angle to match the angle of the wall section 20. As shown in FIG. 6, on the water side 14 of the existing seawall 12 and seawall system 10, two triangular brackets 30 are joined together so as to form a large support and two wedge brackets 42 are stacked between the upper triangular bracket and the wall section 20 so as to compensate for the ten degree angle of the wall section 20. Also as shown, the triangular brackets 30 on the water side of the seawall 12 are offset slightly to compensate for the thickness of the existing seawall 12.

Referring again to FIGS. 1–3 and 6, the wall section details will be discussed. In a preferred embodiment of the present invention, each wall section 20 is actually formed from a pair of identical wall subsections 48 and 50. Each wall subsection 48, 50 is preferably a molded panel of plastic or composite designed to be stiff and strong but reasonably light. The subsections may have one smooth side and one textured side as shown in FIGS. 1 and 2, or two textured sides as shown in FIG. 3. Each subsection 48 and 50 has a length dimension which is greater than its height dimension. As shown in FIG. 6, each subsection 48, 50 also includes a lip 52 extending from one of the long edges which is about half the thickness of the remainder of the subsection 48, 50. The lip 52 is coplanar with the remainder of each subsection 48, 50 but about half as thick as the remainder of the panel. The lips 52 on each subsection 48, 50 are designed to interconnect thereby forming a wall section 20. Obviously, while the illustrated preferred embodiment of the wall section 20 offers several advantages, the wall sections 20 could be constructed in many other ways, as will be clear to one of skill in the art. Other materials may also be used. Also, one panel could be used in place of two panels.

Figure 4:
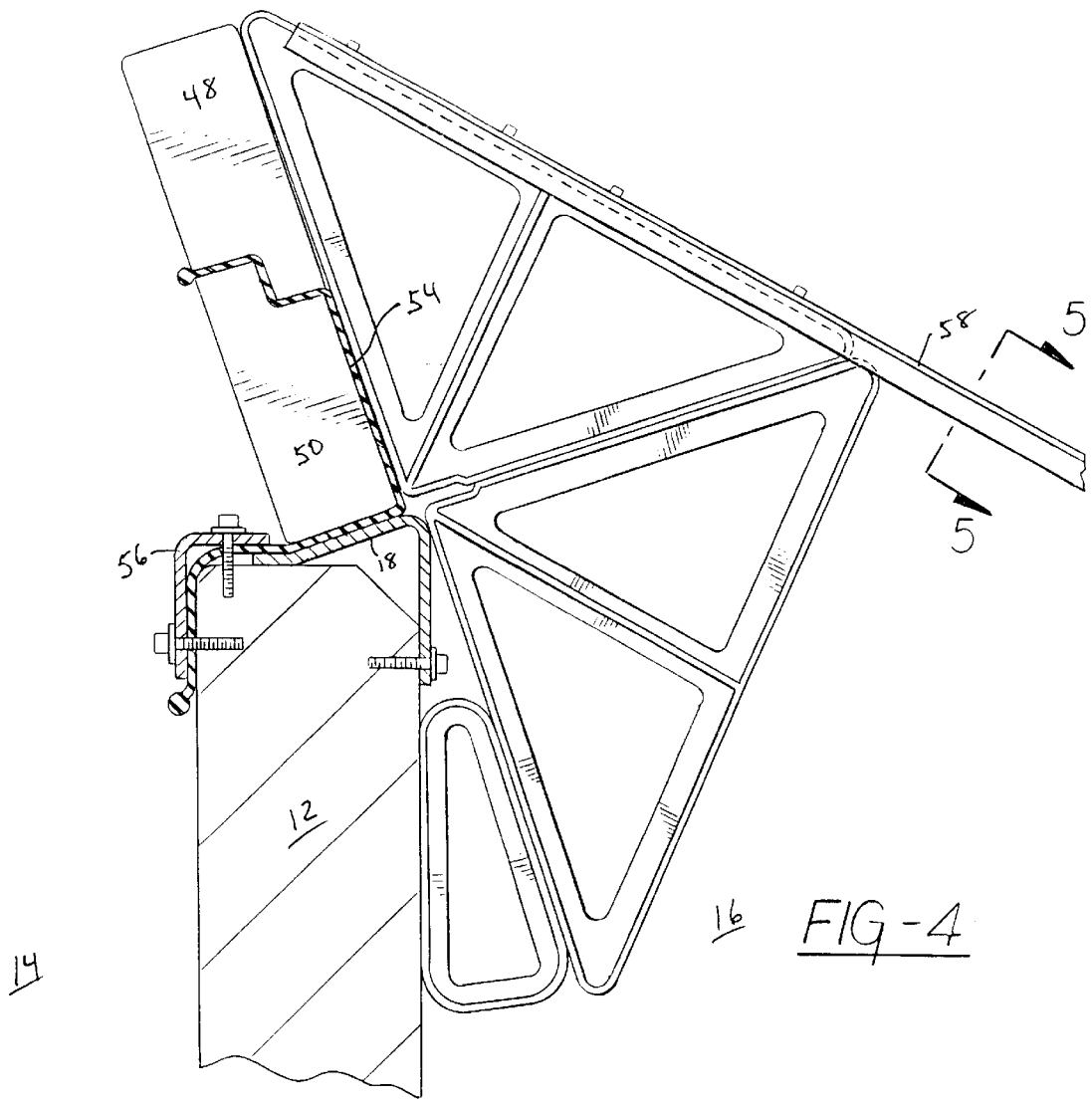
FIG. 4 is an end view of the seawall system according to the present invention installed on top an existing seawall and showing the use of a sealing membrane.

Referring now to FIG. 4, several different aspects of the present invention are shown. Because it is desired to prevent water from leaking from the water side 14 to the dry side 16 of the wall section 20 and existing seawall 12, it is desirable to provide some type of reliable seal. For this purpose, a membrane 54 is used to seal the existing seawall 12 to the wall section 20. In the illustrated embodiment, the lower portion of the membrane 54 is held against the water side 14 of the existing seawall 12 near its upper edge by a toe guard 56. The toe guard 56 serves several purposes. First it secures and seals the membrane 54 to the existing seawall 12. Secondly, the toe guard acts to prevent damage to the membrane 54. When the water level on the wet side 14 of the existing seawall 12 is close to the level of the top of the existing seawall 12, floating debris may repeatedly impact the toe guard 56. Without the toe guard, there would be increased risk of damage to the membrane leading to a leak. The membrane 54 extends from the top of the existing seawall toward the dry side 16 on top of the base bracket 18 which is affixed to the top of the seawall 12. The membrane passes under the lower edge of the lower wall subsection 50 and continues up the dry side 16 of the wall subsection 50. From there, the membrane 54 extends between the upper wall subsection 48 and the lower wall subsection 50 and is clamped therebetween. This serves to seal the upper and lower wall subsections 48 and 50 to one another and to secure the membrane 54 in place.

Referring back to FIGS. 1 and 2, the seawall system is shown with a flat lower wall subsection. In this case, the membrane 54 may be secured to the back of the wall section 20 using a pair of fasteners and an elongated sealing member 55. As shown two sealing members may be used if desired. It should be noted that the membrane 54 may also act as a living hinge if and when it is desired to pivot the wall section downwardly.

Figure 5:
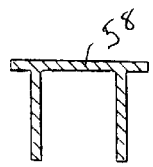
FIG. 5 is a cross sectional view of a channel brace for use with the present invention, the view taken along line 5—5 of FIG. 4.

Another aspect of the present invention is also shown in FIGS. 1, 4 and 5. In some applications, it may be desirable to provide additional reinforcement to the brackets 30.

Towards these ends, a channel brace 58 may be positioned over one of the exposed edges of the upper triangular bracket 30 and secured thereto. The channel brace 58 then extends downwardly to the ground on the dry side 16 of the existing seawall 12 and is anchored thereto. As shown in FIG. 5, the channel brace 58 has an open channel which may be positioned over an edge of the triangular bracket 30.

Referring now to FIG. 3, column 22 includes a central box-like section 60 with a pair of wings 62 and 64 extending sideways therefrom. The wings 62 and 64 are designed for interconnection with adjacent wall sections 20 via connection plates 26.

Each connection plate 26 includes a plurality of holes 66 for connecting the connection plate to wall sections 20 and the wings of columns 22. The connection plate 26 further includes some type of sealing material 68 applied to its back side for sealing the plate to the wall sections 20 or columns 22. In use, fasteners are passed through the elongated holes 66 of a connection plate 26 positioned on one side of the seawall system 10, through corresponding holes in either a wall section 20 or column 22 and through corresponding holes 66 in a corresponding connection plate 26 positioned on the other side of the seawall system. The elongated holes 66 allow the connection plate 26 to act as an expansion joint.

Figure 7:
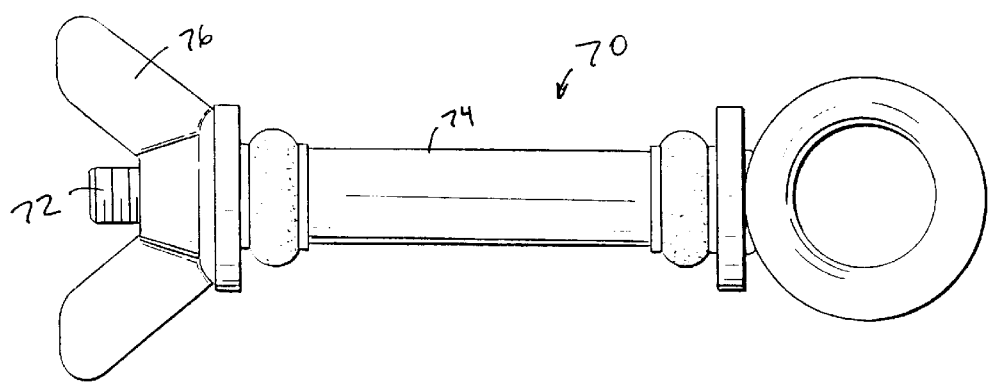
FIG. 7 is a view of a preferred fastener for use with the present invention.

Referring now to FIG. 7, a preferred fastener for use with the present invention is shown generally at 70. The fastener has a central shaft 72 made out of a rigid material such as stainless steel and a surrounding resilient housing 74. The wing nut 76 engages the end of the shaft 72. Tightening the wing nut 76 causes the resilient housing 74 to be compressed thereby expanding the resilient housing 74. The fastener 70 acts to interconnect various components of the seawall system 10 and at the same time the resilient housing 74 acts to seal the opening through which the fastener 70 is passed. When two wall sections 20 are connected end to end, the fasteners 70 are used to interconnect the wall sections using connection plates 26.

The various embodiments of the present invention as previously discussed are designed to be easily installed and removed from an existing seawall 12. Typically, it is not desired to leave the wall sections 20 in place as they will block the view over the existing seawall 12. The fasteners 70 that were previously discussed allow easy connection and removal of the various components of the present invention allowing the entire system to be easily installed and/or removed. Referring back to FIG. 1, after the system 10 has been used to hold back a flood, a homeowner may wish to remove all or part of the system 10. If the homeowner wishes to remove the entire system 10, each of the components are removed and stored. Alternatively, the brackets 30 are removed and the wall sections 20 are disconnected from the columns 22. The wall sections 20 may then be folded downwardly against the water side or dry side of the existing seawall 12 so they may be stored until again needed. The folding of a wall section against the dry side of the seawall is illustrated in FIG. 6. The homeowner may then leave the columns 22 in place with their associated lights 24. When another flood is threatened, the wall sections 20 are merely folded back up into the upright position and secured in place by interconnecting them with the columns 22 and reinforcing them with the brackets 30. As will be clear to one of skill in the art, when the wall sections 20 are folded downwardly against the existing seawall 12, the membrane 54 acts as a hinge allowing the wall section 20 to be moved. However, when the wall section 20 is folded downwardly, it is preferred that the membrane 54 not be continuously loaded. In FIG. 6, one approach to preventing load on the membrane 54 is shown. In this illustration, a safety saddle 78 is connected to a wedge bracket 42 on the dry side 16 of the existing seawall 12. When the wall section 20 is to be stored, the brackets 30 are removed and the wall section 20 is disconnected from the columns 22. The wall section 20 is then pivoted downwardly such that it rests in the safety saddle 78 which supports the weight of the wall preventing excess load on the membrane 54.

As will be clear to those of skill in the art, other approaches are available for supporting the load on the membrane when the wall section is folded. For example, an auxiliary hinge may interconnect the wall section 20 with the existing seawall 12 so that the wall section 20 is supported in all positions, whether folded or upright.

Figure 8:
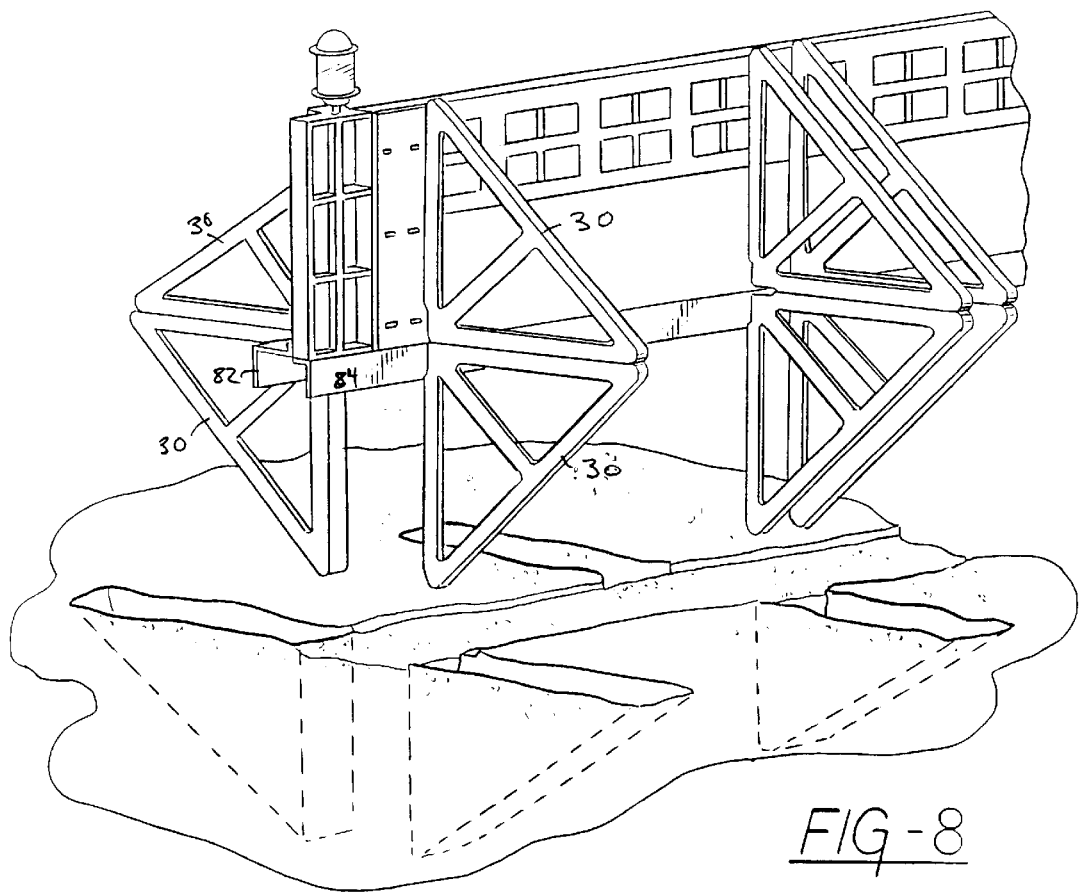
FIG. 8 is an exploded perspective view of an alternative arrangement of the components of a seawall system according to the present invention for installation at ground level.
Figure 9:
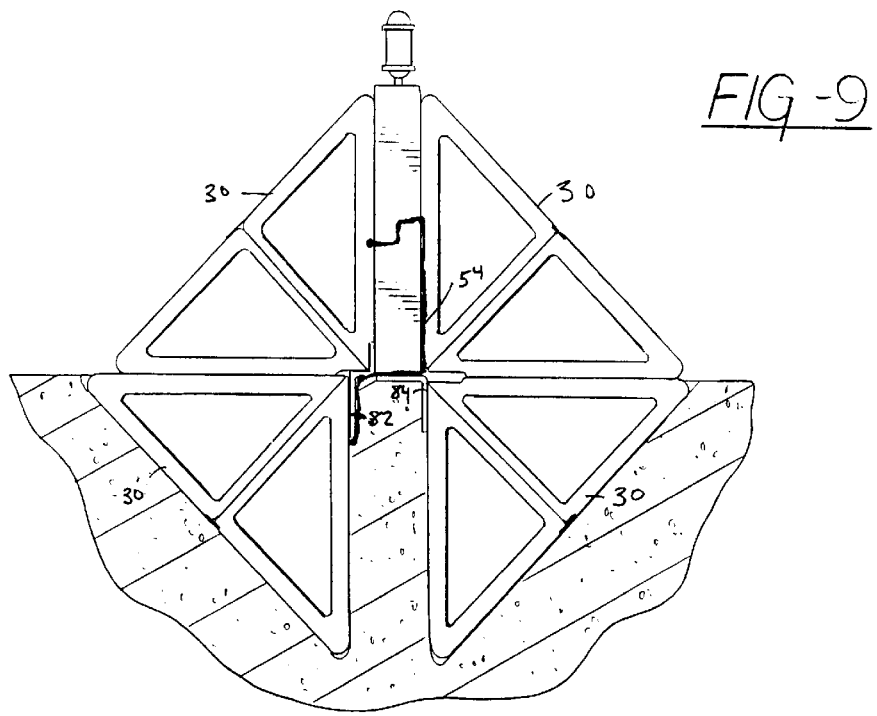
FIG. 9 is an end view of a seawall system according to the present invention installed at ground level.

Thus far, the present invention has been discussed for use with an existing seawall. However, the present invention also provides advantages for use directly on the ground, especially as a replacement for sandbags. Referring now to FIGS. 8 and 9, the present invention is shown for installation on the ground. In this embodiment, an angle iron 82 is buried with one of its legs extending downwardly into the ground and its other leg parallel to ground level. A second angle iron 84 is placed parallel to the first angle iron 82 so that together they form a base on the surface of the ground. The membrane 54 has an edge buried in the ground along with the first angle iron 82. A wall section 20 is placed on top of the angle irons 82 and 84 and extends perpendicularly upwardly from the ground. The membrane 54 extends from below ground up to the top of the first angle iron 82 across below the bottom of the wall section and then up the dry side 16 and is secured between the upper and lower wall subsections 48 and 50. The wall section 20 is held in its upright position by a pair of triangular brackets 30 positioned on each side thereof. Each triangular bracket 30 is positioned such that one of its short sides is adjacent the wall section 20 and the other short side is adjacent the ground. Likewise, a pair of triangular brackets 30 are buried below ground such that one of their short surfaces is flush with the ground and can be interconnected with the above ground triangular brackets 30. Additional anchoring may also be added to further secure the triangular brackets 30.

In order to install the ground level seawall, it is necessary to bury both the angle irons 82 and 84 and the below ground triangular brackets 30. For these purposes trenches as shown in FIG. 8 are first dug. It is envisioned that some type of trenching machine can be used to rapidly form the trenches necessary for burying the angle irons 82 and 84 and the below ground triangular brackets 30. This makes installation of the seawall system rapid and efficient, especially when compared to the highly laborious process of piling sandbags. When the flood has ended, the angle irons 82 and 84 and the below ground triangular brackets 30 may then be left in the ground and only those portions of the seawall system above ground are removed. Some type of cover may then be placed over the angle irons to prevent damage thereto. Alternatively, the entire system may be removed in situations where additional flooding is unlikely. In areas where repeated flooding is likely, and where a permanent seawall is not desired, a below ground concrete footer may be installed in the ground such that the top of the footer is flush with the ground level. The seawall system may then be installed on top of this below ground footer in the same way shown earlier for installing the system on an existing seawall 12. This allows for easy and secure assembly of a temporary seawall but avoids having a permanent above ground seawall.

Figure 10:
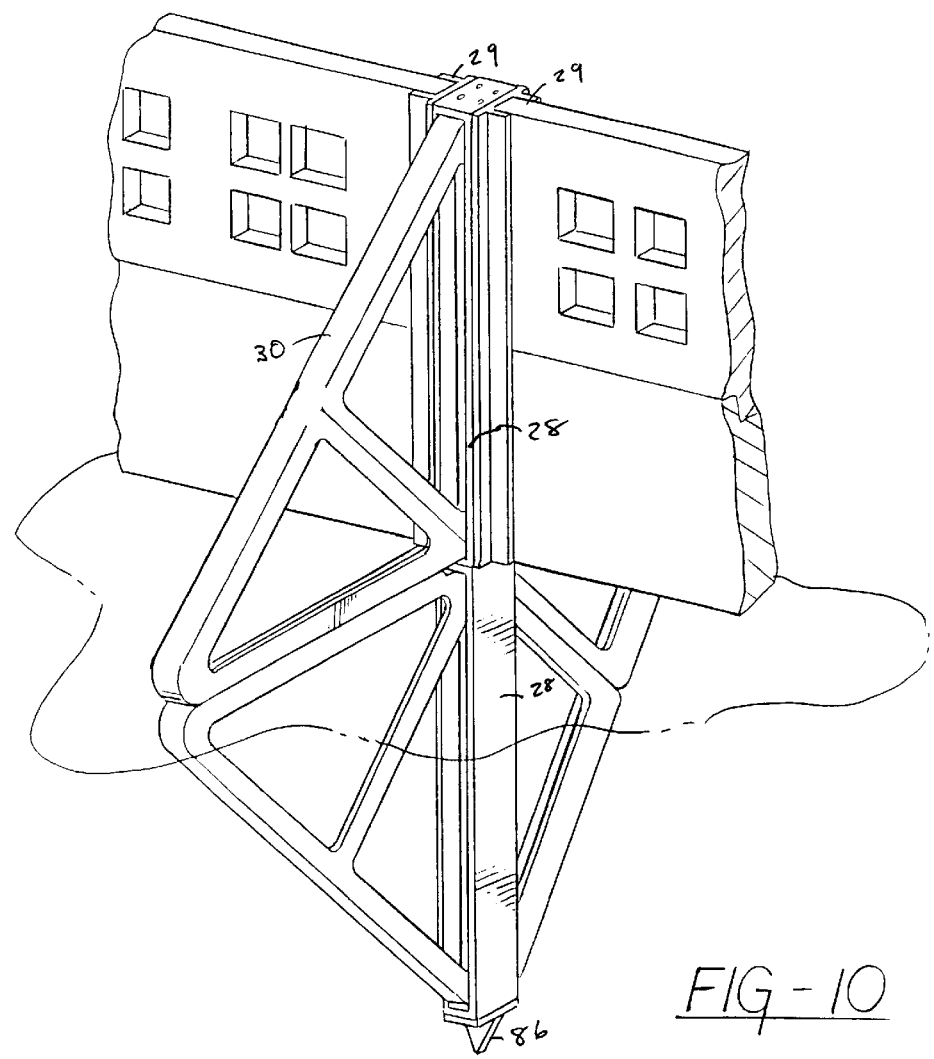
FIG. 10 is a perspective view of another embodiment of a seawall system according to the present invention, utilizing posts and configured for installation at ground level.

Referring now to FIG. 10, an additional embodiment of the present invention is shown. A post 28 may be used to provide support to the wall sections 20. In an application where the portable seawall system 10 is installed on top of an existing seawall, a post may be installed between adjacent wall sections. Triangular brackets 30 may then directly support the post 28. Interconnectors 29 interconnect the post 28 with adjacent wall sections 20. The posts 28 may also be stacked one on top of another as shown in FIG. 10. This may be necessary where multiple wall sections will be extended on top of an existing seawall. The posts 28 also have special utility where the seawall system 10 is installed at ground level as shown in FIG. 10. In this situation, one or two posts may be buried below ground so that the top of one of the posts is flush with ground level. An additional post 28 may then be connected at the top of these buried posts so that it extends upwardly and provides support to the remainder of the seawall system. A pointed end 86 may be connected to the post 28 to assist in embedding the interconnected posts into the ground. The posts 28 preferably are the same height as the wall sections 20 but may also be made other lengths as needed.

Figure 11:
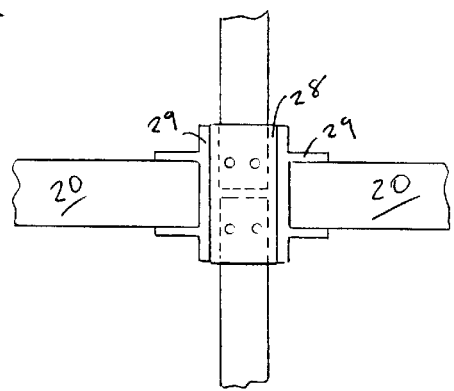
FIG. 11 is a top view of the post, interconnectors, and braces of the system of FIG. 10.

Referring now to FIG. 11, the interconnection between the post 28 and the adjacent wall sections 20 is illustrated. Specifically, interconnectors 29 are provided for interconnecting the post 28 with the wall sections 20. As an alternative, the post and the interconnectors may be formed as an integral unit. As shown, each interconnector has an outwardly open slot into which the end of the wall sections 20 sit. In this way, the wall sections 20 may be quickly and easily attached to the post 28.

Figure 12:
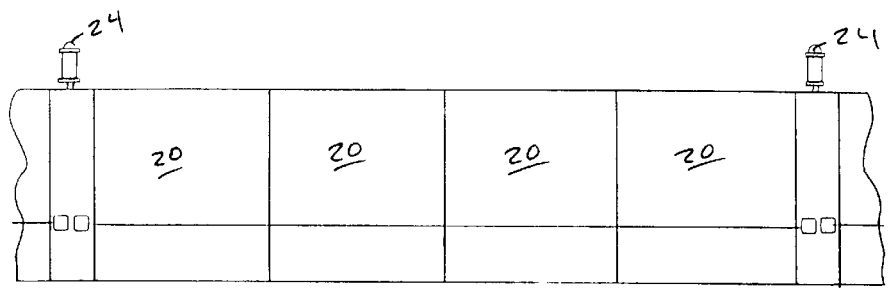
FIG. 12 is a rear elevational view of a trip wire based sensing system for use with the present invention.
Figure 13:
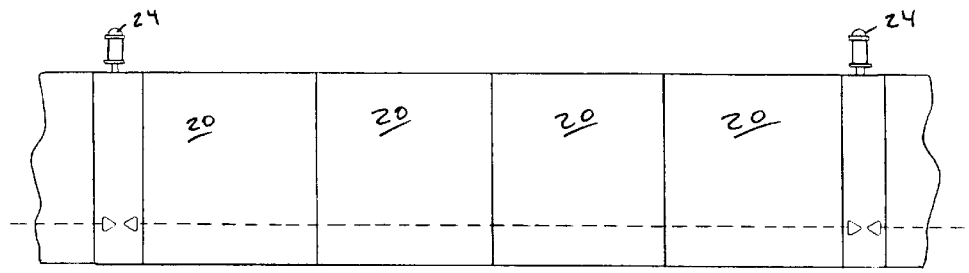
FIG. 13 is a rear elevational view of a photo beam based sensing system for use with the present invention.

Referring now to FIGS. 12 and 13, an additional aspect of the present invention is shown. In areas where the portable seawall system according to the present invention is used, it may be desirable to monitor the seawall to assure there have not been any sections which fail. As discussed earlier, the columns 22 may include lights 24 at their tops. These lights 24 may be used as a signaling system to indicate when a section of the seawall has been breached. For example, in FIG. 12, a trip switch and trip wire crosses from column to column so that if the seawall panels buckle inwardly, the trip wire is stretched signaling a breach. The lights 24 may then be blinked in response. This also directs repair crews to the specific area of a seawall which is threatened. In FIG. 13, an alternative system using photo eyes and a photo beam is shown. Alternatively, the flashing lights may be either replaced or supplemented by an additional signaling means. For example, circuitry associated with the sensing means may be used to trigger a radio signal or to place a cellular phone call to a central monitoring area when a breach has occurred. As will be clear to one of skill in the art, other aspects of the seawall system may also be monitored, such as loads or water level, with the lights 24 or other signaling means serving to communicate the information obtained.

Figure 14:
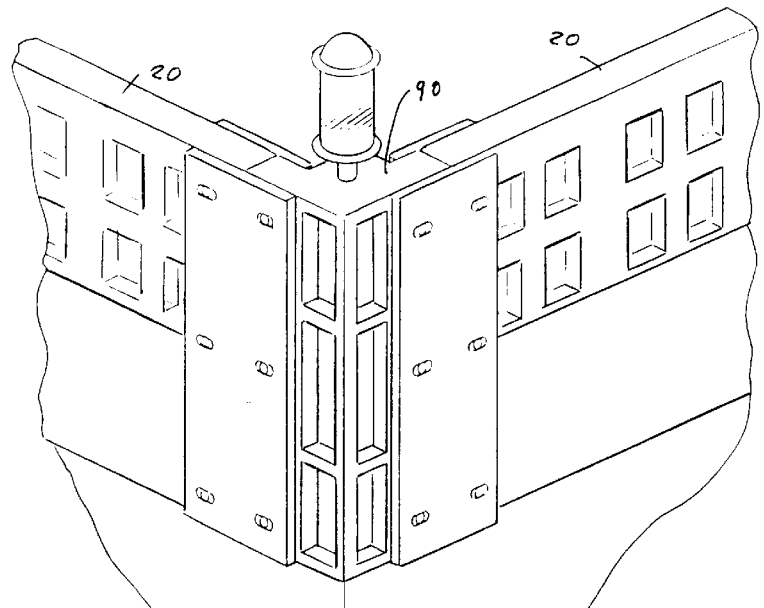
FIG. 14 is a perspective view of a comer that may be used with the present invention.

For some applications, it is desirable to have a seawall wherein the wall sections are not all in a continuous line. For example, it may be desirable to have a 90° bend in the seawall where the shoreline turns. Referring to FIG. 14, a corner post 90 is shown for interconnecting a pair of wall panels 20 at 90° to one another. Obviously, connector post of different shapes may be provided to allow other angles between adjacent wall panels. In this way, the seawall system may be used to follow any shape, including forming a perimeter around an area to be protected. Also, where a higher seawall system is required, additional wall sections 20 and columns 22 may be stacked upwardly and additional brackets 30 used to reinforce the system. As another aspect of the present invention, the wall sections 20 may serve other purposes when not in use. For example, advertisements may be placed on the wall panels 20 so that they are visible when they folded into their nonuse position. Advertising revenue may be used to help offset the cost of purchasing and installing the seawall system.

Yet other embodiments of the present invention may be readily implemented. The foregoing drawings, discussion and description are illustrative of particular embodiments of the present invention, but are not meant to be limitations upon the practice thereof.

What is claimed is:

1. A portable seawall system to be secured to the ground for resisting the passage of water from a water side to a dry side of the seawall system when the system is in an installed position, the system comprising:

a base bracket configured to be positioned generally flush with the ground when the bracket is in the installed position;

a plurality of substantially identical wall sections each having a first face and an opposed second face, the wall sections being arranged end to end so as to define a generally continuous wall and extending generally vertically upwardly from the base bracket when the wall sections are in the installed position, each wall section comprising;

a base wall subsection having a lower edge adjacent the base bracket and an upper edge spaced therefrom when the base wall subsection is in the installed position;

an upper wall subsection having a lower edge that mates with the upper edge of the base wall subsection when in the installed position;

a plurality of substantially identical triangular brace members each having a non-adjustable triangle shaped perimeter with a long side and a pair of short sides;

a first plurality of the brace members each being disposed in the ground at intervals adjacent the base bracket such that one of the short sides of each brace member in the first plurality is generally flush with the ground and the remainder of each brace member in the first plurality extends into the ground when in the installed position;

a second plurality of the brace members each being connected to one of the brace members in the first plurality such that one of the short sides of each brace member in the second plurality is connected to the short side of one of the brace members in the first plurality that is flush with the ground and the other short side of each brace member in the second plurality extends upwardly adjacent the first or second face of the wall sections when in the installed position; and a substantially water impermeable membrane having a first edge portion, an opposed second edge portion, and a central portion therebetween, the first edge portion being adjacent the base bracket and the second edge portion being captured between the upper edges of the base wall subsections and the lower edges of the upper wall subsections such that the membrane resists passage of water between the lower edge of the wall sections and the ground and further substantially seals the upper edges of the base wall subsections to the lower edges of the upper wall subsections when in the installed position.

2. The portable seawall system according to claim 1, wherein the base bracket comprises a pair of elongated L-shaped members, each having one leg extending into the ground and another leg generally flush with the ground when in the installed position.

3. The system according to claim 1, wherein the first edge portion of the membrane extends into the ground when in the installed position.

4. The system according to claim 1, wherein the central portion of the membrane extends between the base bracket and the lower edge of the base wall subsection, and further extends up the base wall subsection on the dry side of the seawall system to the second end portion captured between the base and upper wall subsections.

5. The system according to claim 1, wherein the base wall subsection and the upper wall subsection both comprise generally planar members with a coplanar lip extending therefrom, the coplanar lip of the base wall subsection defining the upper edge and the coplanar lip of the upper wall subsection defining the lower edge, the coplanar lips mating together to form a wall section.

6. The system according to claim 1, wherein the upper and base wall subsections are substantially identical and have a first edge and an opposed second edge, the first edge of the base wall subsection being the upper edge and the first edge of the upper wall subsection being the lower edge.

7. The system according to claim 1, wherein the wall subsections are molded from a plastic or composite material.

8. The system according to claim 1, wherein the brace members in the first plurality extend generally perpendicularly from the base bracket when in the installed position.

9. The system according to claim 1, wherein the triangle brace members are molded from a composite or plastic material, the sides of the triangle base members being L-shaped with one leg being in the plane of the bracket and one leg being generally perpendicular thereto.

10. The system according to claim 1, further comprising a column positioned between a pair of end to end wall sections and interconnection means for interconnecting the column with the adjacent wall sections.

11. The system according to claim 10, wherein the wall sections adjacent the column are generally coplanar.

12. The system according to claim 10, wherein the wall sections adjacent the column are disposed at an angle to each other such that the column and adjacent wall sections define a corner.

13. An auxiliary seawall system for vertically extending an existing seawall when the auxiliary system is in an installed position, the existing seawall having a pair of sides and an upper end, the system comprising:
   a base bracket configured to be disposed on the upper end of the existing seawall when in the installed position;
   a plurality of substantially identical wall sections each having a first face and an opposed second face, the wall sections being arranged end to end so as to define a generally continuous wall and extending upwardly from the base bracket when the wall sections are in the idled position, each wall section comprising;
      a base wall subsection having a lower edge adjacent the base bracket and an upper edge spaced therefrom when the base wall subsection is in the installed position;
      an upper wall subsection having a lower edge that mates with the upper edge of the base wall subsection when in the installed position;
   a plurality of substantially identical triangular brace members each having a non-adjustable triangle shaped perimeter with a long side and a pair of short sides;
      a first plurality of the brace members each having one short side connected to one of the sides of the existing seawall such that the other short side extends outwardly from the upper end of the existing seawall when in the installed position;
      a second plurality of the brace members each being connected to one of the brace members in the first plurality such that one of the short sides of each brace member in the second plurality is connected to the short side of one of the brace members in the first plurality, that extends outwardly from the upper end of the existing seawall and the other short side of each brace member in the second plurality extends upwardly adjacent the first or second face of the wall sections when in the installed position; and
   a substantially water impermeable membrane having a first edge portion, an opposed second edge portion, and a central portion therebetween, the first edge portion being adjacent the base bracket and the second edge portion being captured between the upper edges of the base wall subsections and the lower edges of the upper wall subsections such that the membrane resists passage of water between the lower edge of the wall sections and the existing seawall and further substantially seals the upper edges of the base wall subsections to the lower edges of the upper wall subsections when in the installed position.

14. The system according to claim 13, wherein the first edge portion of the membrane is connected to the existing seawall when in the installed position.

15. The system according to claim 13, further comprising a toe guard bracket having a generally L-shaped cross-section, the toe guard bracket covering one edge of the upper end of the existing sidewall when in the installed position, the first edge portion of the membrane being captured between the toe guard bracket and the existing seawall.

16. The system according to claim 13, wherein the central portion of the membrane extends between the base bracket and the lower edge of the base wall subsection, and further extends up the base wall subsection to the second end portion captured between the base and upper wall subsections.

17. The system according to claim 16, wherein the wall sections and the membrane are configured and positioned on the existing seawall such that the wall subsections may be folded downwardly with the membrane serving as a living hinge.

18. The system according to claim 13, wherein the base wall subsection and the upper wall subsection both comprise generally planar members with a coplanar lip extending therefrom, the coplanar lip of the base wall subsection defining the upper edge and the coplanar lip of the upper wall subsection defining the lower edge, the coplanar lips mating together to form a wall section.

19. The system according to claim 13, wherein the upper and base wall subsections are substantially identical and have a first edge and an opposed second edge, the first edge of the base wall subsection being the upper edge and the first edge of the upper wall subsection being the lower edge.

20. The system according to claim 13, wherein the wall subsections are molded from a plastic or composite material.

21. The system according to claim 13, wherein the triangle brace members are molded from a composite or plastic material, the sides of the triangle base members being L-shaped with one leg being in the plane of the bracket and one leg being generally perpendicular thereto.

22. The system according to claim 13, further comprising a column positioned between a pair of end-to-end wall sections and interconnection means for interconnecting the column with the adjacent wall sections.

23. The system according to claim 22, wherein the wall sections adjacent the column are generally coplanar.

24. The system according to claim 22, wherein the wall sections adjacent the column are disposed at an angle to each other such that the column and adjacent wall sections define a corner.

25. The system according to claim 13, further comprising a plurality of wedge-shaped brackets having a first and a second side at an acute angle to one another, one or more wedge brackets being disposed between the existing seawall and the first plurality of brace members or between the wall sections and the second plurality of brace members such that the wall sections are supported at an angle to the existing seawall.

26. The system according to claim 13, further comprising a support brace having a first end interconnected with the long side of one of the brace members in the second plurality and a second end supported by the ground for further strengthening the seawall system.

27. The system according to claim 13, wherein the system further has a storage position wherein the membrane functions as a living hinge and the wall sections are folded downwardly toward the existing seawall such that the lower edge of the base wall subsection is adjacent the base bracket and retained in position by the membrane and the upper edge of the upper wall subsection is lower than the base bracket.

28. The system according to claim 27, further comprising a saddle connected to the existing seawall such that the upper edge of the upper wall subsection of one of the wall sections rests in the saddle when in the storage position.

29. The system according to claim 13, further comprising a signaling system operable to indicate when a section of the auxiliary seawall system has been breached.

30. The system according to claim 29, wherein the auxiliary seawall system further comprises at least two columns each disposed between a pair of end to end wall sections and connection means for interconnecting each column with the wall sections adjacent each wall section, the signaling system comprising a light disposed on one of the columns.

31. The system according to claim 30, wherein the signaling system further comprises a trip wire extending between the columns for sensing when the wall sections between the columns move out of position.

32. The system according to claim 30, wherein the signaling system further comprises a photon projecting apparatus for projecting a beam between columns such that the beam is broken when the wall sections between the columns move out of position.

33. The system according to claim 29, wherein the signaling system includes a wireless transmitter for transmitting a signal when the auxiliary seawall system has been breached.

34. A portable seawall system to be secured to the ground for resisting the passage of water from a water side to a dry side of the seawall system when the system is in an installed position, the system comprising:
- a base bracket configured to be positioned generally flush with the ground when the bracket is in the installed position;
- a plurality of substantially identical wall sections each having a first face and an opposed second face, the wall sections being arranged end to end so as to define a generally continuous wall and extending generally vertically upwardly from the base bracket when the wall sections are in the installed position;
- a plurality of substantially identical triangular brace members each having a triangle shaped perimeter with a long side and a pair of short sides, the plurality of brace members being disposed at intervals adjacent the base member with approximately half of each brace member being disposed in the ground and approximately half of each member extending generally vertically upwardly adjacent the first or second face of the wall sections when in the installed position; and
- a substantially water impermeable membrane having a pair of opposed edges, one of the edges being adjacent the base bracket and the other edge being connected to the wall sections such that the membrane resists passage of water between the lower edge of the wall sections when in the installed position.

35. A portable seawall system to be disposed on a support structure for resisting the passage of water from a water side to a dry side of the seawall system when the system is in an installed position, the system comprising:
- a base bracket configured to be positioned on the support structure when the bracket is in the installed position;
- a plurality of substantially identical wall sections each having a first face and an opposed second face, the wall sections being arranged end to end so as to define a generally continuous wall and extending generally vertically upwardly from the base bracket when the wall sections are in the installed position; and
- a plurality of substantially identical triangular brace members each having a non-adjustable triangle shaped perimeter with a long side and a pair of short sides, one short side of each of the plurality of brace members being joined to the short side of another of the brace members so as to form a plurality of larger generally triangle shaped brace assemblies having an upper portion an a lower portion, the upper portion of each of the brace assemblies being connected to the first or second face of the wall sections for supporting the wall sections in their generally vertically extending position when in the installed position, each brace member comprising a molded member with the short and long sides having L-shaped cross sections with one leg in the plane of the member and one leg generally perpendicular thereto.

36. An auxiliary seawall system for vertically extending an existing seawall when the auxiliary system is in an installed position, the existing seawall having a water side surface and a dry side surface and an upper end with a water side edge and dry side edge, the system comprising:
- a base bracket configured to be disposed on the upper end of the existing seawall when in the installed position;
- a plurality of wall sections each having a water side face and an opposed dry side face, the wall sections being arranged end to end so as to define a generally continuous wall and extending upwardly from the base bracket with the water side face facing the water side edge of the existing seawall when the wall sections are in an installed position, each wall section comprising;
  - a base wall subsection having a lower edge adjacent the base bracket and an upper edge spaced therefrom when the base wall subsection is in the installed position;
  - an upper wall subsection having a lower edge that mates with the upper edge of the base wall subsection when in the installed position;
- a plurality of brace members supporting the wall sections in the upwardly extending position when in the installed position;
- a toe guard bracket having a generally L-shaped cross section, the toe guard bracket covering the water side edge of the upper end of the existing seawall when in the installed position; and a substantially water impermeable membrane having a pair of opposed edge portions and a central portion therebetween;
one of the edge portions being captured between the toe guard bracket and the waterside edge of the upper end of the existing seawall;
the central portion extending between the lower edge of the base wall subsections and the base bracket and up the dry side face of the wall sections; and
the other edge portion being captured between the upper edges of the base wall subsections and the lower edges of the upper wall subsections such that the membrane resists passage of water between the lower edge of the base wall subsections and the existing seawall and further substantially seals the upper edges of the base wall subsections to the lower edges of the upper wall subsections when in the installed position.

37. A portable seawall system to be disposed on a support structure for resisting the passage of water from a water side to a dry side of the seawall system when the system is in an installed position, the system comprising:
a base bracket configured to be positioned on the support surface when the bracket is in the installed position;
a plurality of substantially identical wall sections each having a water side face and an opposed dry side face, the wall sections being arranged end-to-end so as to define a generally continuously wall and extending upwardly from the base bracket with the water side face facing the water side of the seawall system when the wall sections are in the installed position, each wall section comprising:
each wall section comprising;
a base wall subsection have a lower edge adjacent to the base bracket and an upper edge spaced therefrom when the base wall subsection is in the installed position;
an upper wall subjection having a lower edge that meets with the upper edge of the base wall subsection when in the installed position;
a plurality of substantially identical triangular brace members each having a nonadjustable triangle-shaped perimeter with a long side and a pair of short sides, the brace assemblies being connected to the water side face or the dry side face of the wall sections so as to support the wall sections in their generally upwardly extending position;

a substantially water impermeable membrane having a pair of opposed edge portions and a a central portion therebetween;
one of the edge portions being disposed adjacent to the base bracket;
the central portion extending between the lower edge of the base wall subsections and the brace bracket and of the dry side face of the wall sections; and
the other edge portion being captured between the upper edges of the base wall subsections and the lower edges of the upper wall subsections such that the membrane resists passage of water between the lower edge of the base wall subsections and the existing sea wall and further substantially seals the upper edges of the base wall subsections to the lower edges of the upper wall subsections when in the installed position.

38. An auxiliary seawall system for vertically extending an existing seawall, the existing seawall having a water side surface and a dry side surface and an upper end with a water side edge and dry side edge, the system comprising:
a base bracket disposed on the upper end of the existing seawall;
a plurality of wall sections each having a water side face and an opposed dry side face, the wall sections being arranged end to end so as to define a generally continuous wall, each wall section having a bottom edge adjacent the base bracket and an opposed upper edge;
a substantially water impermeable membrane having a pair of opposed edge portions and a central portion therebetween, one of the edge portions being connected to the base bracket and other edge portion being connected to the wall sections, the membrane providing a flexible living hinge between the base bracket and the wall sections such that the wall sections have a use position wherein the wall sections extend upwardly from the base bracket and a storage position wherein the wall sections are folded downwardly such that the upper edges are below the base bracket; and
a plurality of removable brace members supporting the wall sections when the wall sections are in the upwardly extending use position.

* * * * *

UNITED STATES PATENT AND TRADEMARK OFFICE
CERTIFICATE OF CORRECTION

PATENT NO.       : 6,454,491 B1
DATED            : September 24, 2002
INVENTOR(S)      : Mark Wyane It is certified that error appears in the above-identified patent and that said Letters Patent is hereby corrected as shown below:

Column 2,
Line 4, replace "part" with -- parts --.
Line 6, replace "top an" with -- top of an --.
Line 32, replace "comer" with -- corner --.

Column 3,
Line 3, replace "atop them" with -- atop them. --.
Line 15, replace "along" with -- a long --.

Column 4,
Line 61, replace "As shown" with --As shown, --.

Column 7,
Line 58, replace "post" with -- posts --.

Column 8,
Line 2, replace "they folded" with -- they are folded --.

Column 9,
Line 56, replace "idled" with -- installed --.

Column 11,
Line 45, replace "photon" with -- photobeam --.

Column 12,
Line 32, replace "an a" with -- and a --.

UNITED STATES PATENT AND TRADEMARK OFFICE
CERTIFICATE OF CORRECTION

PATENT NO. : 6,454,491 B1
DATED : September 24, 2002
INVENTOR(S) : Mark Wyane

It is certified that error appears in the above-identified patent and that said Letters Patent is hereby corrected as shown below:

Column 13,
Lines 31-32, delete "each wall section comprising:".
Line 34, replace "have" with -- having --.
Line 38, replace "subjection" with -- subsection --.

Column 14,
Line 2, replace "a a central" with -- a central --.
Line 15, replace "sea wall" with -- seawall --.

Signed and Sealed this

Eleventh Day of March, 2003

JAMES E. ROGAN
*Director of the United States Patent and Trademark Office*